United States Patent
Ozaki

(10) Patent No.: US 8,953,719 B2
(45) Date of Patent: Feb. 10, 2015

(54) SIGNAL DETECTOR, SIGNAL DETECTION METHOD, AND COMMUNICATION TERMINAL APPARATUS

(71) Applicant: Fujitsu Limited, Kawasaki (JP)

(72) Inventor: Kazuyuki Ozaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 13/733,613

(22) Filed: Jan. 3, 2013

(65) Prior Publication Data

US 2013/0177109 A1  Jul. 11, 2013

(30) Foreign Application Priority Data

Jan. 6, 2012  (JP) .................................. 2012-001261

(51) Int. Cl.
  *H03D 1/00* (2006.01)
  *H04L 27/06* (2006.01)
  *H04B 1/10* (2006.01)

(52) U.S. Cl.
  CPC ..................................... *H04B 1/1027* (2013.01)
  USPC ............ 375/340; 375/285; 375/343; 375/346

(58) Field of Classification Search
  USPC .......... 375/224, 259, 285, 316, 340, 343, 346
  See application file for complete search history.

(56) References Cited

U.S. PATENT DOCUMENTS

| 6,404,806 | B1 * | 6/2002 | Ginesi et al. ................... 375/222 |
| 2005/0276361 | A1 * | 12/2005 | Kim et al. ...................... 375/347 |
| 2006/0251156 | A1 | 11/2006 | Grant et al. |
| 2006/0280232 | A1 * | 12/2006 | Arima ........................... 375/148 |
| 2010/0283902 | A1 * | 11/2010 | Rashid et al. .................. 348/725 |

FOREIGN PATENT DOCUMENTS

| JP | 2007-220236 A | 8/2007 |
| JP | 2007-274250 A | 10/2007 |
| JP | 2007-309846 A | 11/2007 |
| JP | 2008-085894 A | 4/2008 |
| JP | 2008-546349 A | 12/2008 |

OTHER PUBLICATIONS

Yonghong Zeng et al., "Eigenvalue-Based Spectrum Sensing Algorithms for Cognitive Radio", IEEE Transactions on Communications, Jun. 2009, pp. 1784-1793, vol. 57, No. 6.

* cited by examiner

*Primary Examiner* — Jean B Corrielus
(74) *Attorney, Agent, or Firm* — Arent Fox LLP

(57) ABSTRACT

There is provided a signal detector which includes a correlation emphasis unit configured to generate correlation emphasis signals corresponding to the respective fixed intervals, an autocorrelation matrix generation unit configured to generate an autocorrelation matrix, a noise power estimation unit configured to estimate noise power in the correlation emphasis signals, a noise power matrix generation unit configured to generate, a noise power matrix having noise power components, a noise removal unit configured to remove an influence of noise from the autocorrelation matrix, an eigenvalue calculation unit configured to calculate an eigenvalue of the autocorrelation matrix from which the influence of noise has been removed by the noise removal unit, and a signal judgment unit configured to determine whether a signal transmitted from an external apparatus is included in the received signals.

10 Claims, 7 Drawing Sheets

SIGNAL DETECTOR, SIGNAL DETECTION METHOD, AND COMMUNICATION TERMINAL APPARATUS

CROSS-REFERENCE TO RELATED APPLICATION

This application is based upon and claims the benefit of priority of the prior Japanese Patent Application No. 2012-001261, filed on Jan. 6, 2012, the entire contents of which are incorporated herein by reference.

FIELD

The embodiments discussed herein are related to a signal detector, a signal detection method, and a communication terminal apparatus.

BACKGROUND

Today, mobile communication systems have a serious problem that a resource of frequencies is increasingly becoming insufficient with increasing popularity of broadband communication. Techniques such as a cognitive radio communication technique have been proposed to solve the above problem. In the cognitive radio communication technique, a communication terminal apparatus or the like checks conditions in circumstances in terms of radio waves, and changes a frequency or a communication method depending on the conditions.

A method of realizing the cognitive radio communication is, for example, to detect a frequency which is not used at a point of time when communication is tried to be started, and communication is performed using the detected frequency. To realize this method, a signal detector is used to detect a frequency which is being used or a frequency which is not being used.

A conventional technique for detecting a signal using a signal detector is to determine whether there is a signal or not based on a ratio of a maximum eigenvalue to a minimum eigenvalue of an autocorrelation matrix of a received signal. More specifically, in this conventional technique, the ratio of the maximum eigenvalue to the minimum eigenvalue is compared with a threshold value. If the ratio is equal to or greater than the threshold value, it is determined that there is a signal, but otherwise it is determined that there is no signal.

In another conventional technique, to inhibit eigenvalues from being disturbed by noise, eigenvalues are determined while cyclically shifting column vectors of a signal matrix thereby estimating a direction in which a radio wave is coming. In another conventional technique, a minimum eigenvalue is detected from eigenvalues of a correlation matrix of signals received by a plurality of antennas. The detected minimum eigenvalue is regarded as noise, and noise is removed by subtracting the minimum eigenvalue from the maximum eigenvalue and a second eigenvalue thereby obtaining eigenvalues including no noise components. Using the resultant eigenvalues including no noise components, a direction in which a radio wave comes and a space angle are estimated. In another technique, when SNR is estimated using a disturbance correlation matrix, minimum eigenvalues are regarded as noise, and an average of minimum eigenvalues is calculated to improve noise estimation accuracy.

Descriptions of related techniques may be found, for example, in Japanese Laid-open Patent Publication No. 2007-309846, Japanese Laid-open Patent Publication No. 2007-274250, Japanese Laid-open Patent Publication No. 2007-220236, Japanese Laid-open Patent Publication No. 2008-85894, Japanese Laid-open Patent Publication No. 2008-546349, etc.

Descriptions of related techniques may also be found, for example, in Y. Zeng and Y. Liang, "Eigenvalue-Based Spectrum Sensing Algorithms for Cognitive Radio," IEEE Trans. on Commun., Vol. 57, No. 6, June 2009, etc.

SUMMARY

According to an aspect of the invention, a signal detector includes a correlation emphasis unit configured to, based on received signals that are given at fixed intervals and are overlapped with each other, generate correlation emphasis signals corresponding to the respective fixed intervals, an autocorrelation matrix generation unit configured to generate an autocorrelation matrix based on the correlation emphasis signals generated by the correlation emphasis unit, a noise power estimation unit configured to estimate noise power in the correlation emphasis signals, a noise power matrix generation unit configured to generate, based on the autocorrelation matrix and the noise power, a noise power matrix included in the autocorrelation matrix, the noise power matrix having noise power components, a noise removal unit configured to remove, based on the autocorrelation matrix and the noise power matrix, an influence of noise from the autocorrelation matrix, an eigenvalue calculation unit configured to calculate an eigenvalue of the autocorrelation matrix from which the influence of noise has been removed by the noise removal unit, and a signal judgment unit configured to determine, based on the eigenvalue calculated by the eigenvalue calculation unit, whether a signal transmitted from an external apparatus is included in the received signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A received signal is a mixture of noise and a signal actually transmitted from another communication apparatus or the like. Therefore, the autocorrelation matrix of the received signal includes signal components and noise components. When an SNR (Signal to Noise power Ratio) is low, in other words, when noise power is large relative to signal power, the maximum eigenvalue and the minimum eigenvalue of the autocorrelation matrix may be nearly equal to each other. Therefore, in the technique in which the determination as to whether there is a signal or not is based on the ratio of the maximum eigenvalue to the minimum eigenvalue, if the SNR is small, the ratio may not be greater than the threshold value even when there is actually a signal transmitted from another communication apparatus. In such a case, the signal detector may erroneously determine that there is no signal although there is actually a signal transmitted from another communication apparatus.

Even when the conventional technique in which column vectors of a signal matrix is cyclically shifted is used, it is difficult to distinguish between a received signal and noise if the SNR is low. Also in the conventional technique in which the minimum eigenvalue is regarded as noise and the noise is removed by subtracting the minimum eigenvalue from the maximum eigenvalue and the second eigenvalue, it is difficult to clearly distinguish between the received signal and the noise if the SNR is low. Furthermore, in the estimation of SNR using the disturbance correlation matrix, even if minimum eigenvalues are regarded as noise and an average of minimum eigenvalues is calculated to improve noise estimation accuracy according to the conventional technique described above, it is still difficult to distinguish between the received signal and the noise when the SNR is low.

In view of the above, the embodiments disclosed herein is related to a signal detector, a signal detection method, and a communication terminal apparatus, capable of accurately determining whether there is a signal or not even when the SNR is low.

Embodiments of a signal detector, a signal detection method, and a communication terminal apparatus are described in detail below with reference to drawings. Note that the description below is merely for providing examples and the disclosure is not limited to details of the embodiments of the signal detector, the signal detection method, and the communication terminal apparatus.

Embodiments

Figure 1:
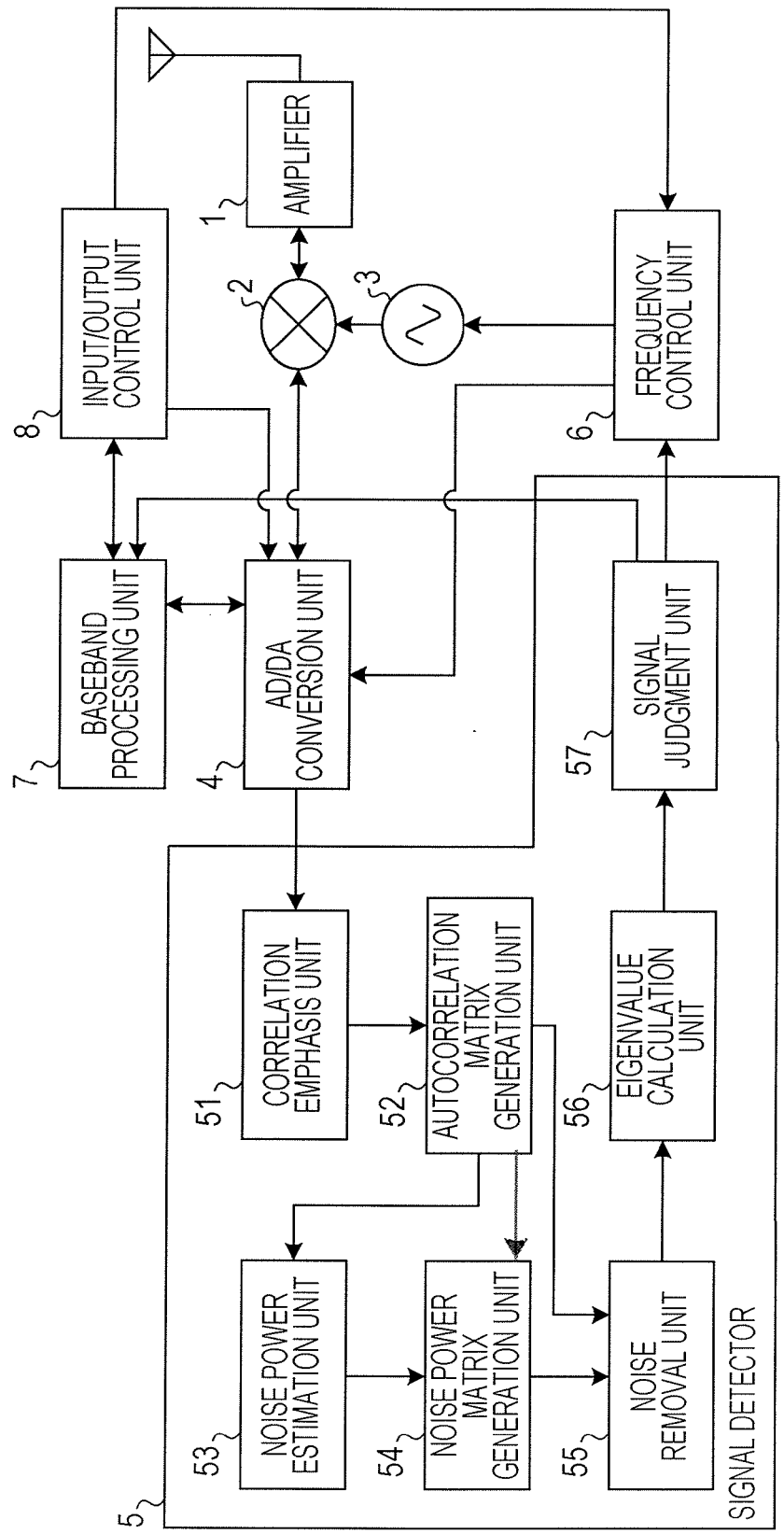
FIG. 1 is a block diagram of a communication terminal apparatus according to an embodiment.

FIG. 1 is a block diagram illustrating a communication terminal apparatus according to an embodiment. As illustrated in FIG. 1, the communication terminal apparatus according to the present embodiment includes an amplifier 1, a mixer 2, an oscillator 3, an AD/DA conversion unit 4, a signal detector 5, a frequency control unit 6, a baseband processing unit 7, and an input/output control unit 8.

The amplifier 1 amplifies a received signal received via an antenna. The amplifier 1 outputs the amplified received signal to the mixer 2. The amplifier 1 also amplifies a transmission signal input from the mixer 2 and transmits the resultant signal to an apparatus, with which to communicate, via the antenna.

The oscillator 3 receives information as to a frequency used as a local frequency from the frequency control unit 6. The oscillator 3 generates an oscillation signal with the local frequency equal to the frequency indicated by the received information. The oscillator 3 outputs the generated oscillation signal to the mixer 2.

The mixer 2 functions as a frequency converter. The mixer 2 receives an input of the received signal from the amplifier 1. The mixer 2 also receives an input of the oscillation signal from the oscillator 3. The mixer 2 applies the oscillation signal to the received signal. As a result, the received signal and the oscillation signal are mixed together and the frequency of the received signal is converted to a frequency of a baseband signal. The resultant received signal converted by the mixer 2 into the baseband signal is output to the AD/DA conversion unit 4. The mixer 2 generates a carrier wave by converting the frequency of the transmission signal input from the AD/DA conversion unit 4. The carrier wave converted from the transmission signal is output from the mixer 2 to the amplifier 1.

In a case where a communication request is sent to another communication terminal apparatus to start communication (hereinafter, this case will be referred to as the case where the present apparatus is a communication initiator), the AD/DA conversion unit 4 has two modes, i.e., a usable frequency band detection mode and a communication mode. In the case where the present apparatus is a communication initiator, the AD/DA conversion unit 4 receives, from the input/output control unit 8, an instruction specifying that the usable frequency band detection mode is to be started, and operates in the usable frequency band detection mode. Thereafter, if the AD/DA conversion unit 4 receives a communication start notification from the frequency control unit 6, the mode is switched into the communication mode and the AD/DA conversion unit 4 operates in this communication mode until the communication is ended.

The AD/DA conversion unit 4 receives an input of the received signal converted in the baseband signal (hereinafter also referred to simply as the baseband signal of the received signal) from the mixer 2. The AD/DA conversion unit 4 converts the baseband signal of the received signal into a digital signal. Thereafter, when the operation is in the usable frequency band detection mode, the AD/DA conversion unit 4 outputs the received signal converted into the digital form to the correlation emphasis unit 51 of the signal detector 5. On the other hand, when the operation is in the communication mode, the AD/DA conversion unit 4 outputs the received signal converted into the digital form to the baseband processing unit 7.

The signal detector 5 includes the correlation emphasis unit 51, an autocorrelation matrix generation unit 52, a noise power estimation unit 53, a noise power matrix generation unit 54, a noise removal unit 55, an eigenvalue calculation unit 56, and a signal judgment unit 57.

The correlation emphasis unit 51 receives an input of the received signal converted into the digital form from the AD/DA conversion unit 4. The received signal y(t) output from the AD/DA conversion unit 4 at time t is represented by a following equation (1).

$$y(t) = \begin{cases} s(t) + n(t) & \text{(when there is a signal)} \\ n(t) & \text{(when there is no signal)} \end{cases} \quad (1)$$

In equation (1), s(t) denotes a signal component at time t, and n(t) denotes a noise component at time t. That is, when the received signal includes a signal transmitted from another communication terminal apparatus, the received signal includes a signal component and a noise component. On the other hand, in the case where the received signal does not include a signal transmitted from another communication terminal apparatus, in other words, a frequency band of interest is not used, the received signal includes only a noise component.

The correlation emphasis unit 51 performs a correlation emphasis process on the received signal represented by equation (1). More specifically, for example, the correlation emphasis unit 51 performs the correlation emphasis process on the received signal by determining an arithmetic mean of a plurality of received signals received at different times in a continuous time period. In the present embodiment, the correlation emphasis unit 51 calculates the arithmetic mean of M received signals in a continuous time period. That is, by determining the arithmetic mean of M received signals, the correlation emphasis unit 51 obtains a correlation emphasis signal y'(t) according to equation (2) described below.

$$y'(t) = \frac{1}{M} \sum_{k=0}^{M-1} y(t+k) \qquad (2)$$

The correlation emphasis signal y'(t) includes M signals from a received signal y(t) received at time t to a received signal y(t+(M−1)) received at time t+(M−1). That is, each correlation emphasis signal y'(t) includes at least one signal equal to one of the received signals included in the signals from the correlation emphasis signal y'(t−(M−1)) to the correlation emphasis signal y'(t+(M−1)). For example, the received signals included in the correlation emphasis signal y'(t) and the received signals included in the correlation emphasis signal y'(t+1) overlap at M−2 signals from received signal y(t+1) to the received signal y(t+(M−1)). Because each correlation emphasis signal includes a received signal included in another correlation emphasis signal as described above, each correlation emphasis signal y'(t) is greater in correlation than each received signal y(t) without being subjected to the correlation emphasis process.

Figure 2:
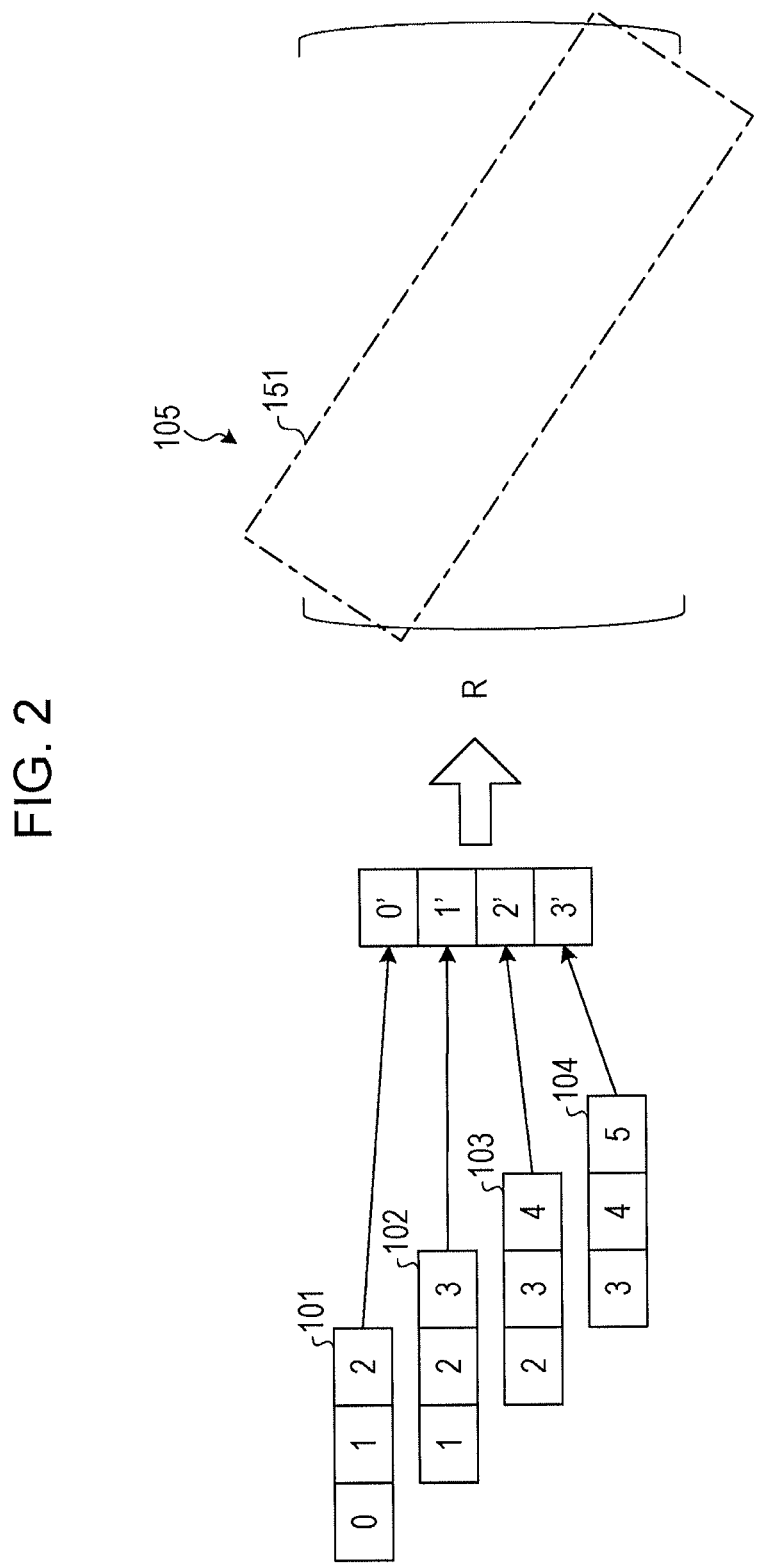
FIG. 2 is a diagram illustrating correlations among correlation emphasis signals.
Figure 3:
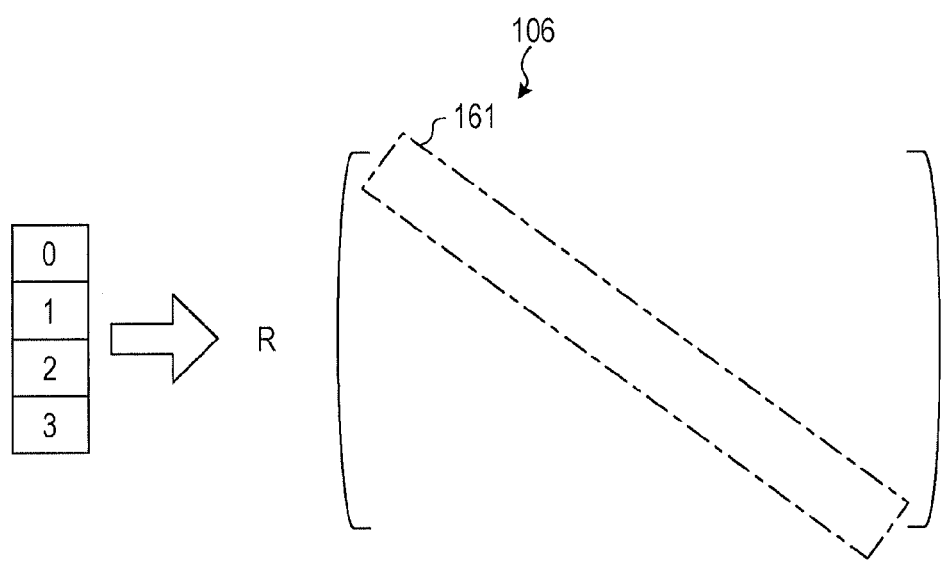
FIG. 3 is a diagram illustrating correlations among received signals.

Referring to FIG. 2 and FIG. 3, the strength of the correlation of the correlation emphasis signal relative to the strength of the correlation of the received signal is described in further detail below. FIG. 2 illustrates an example of a correlation of a correlation emphasis signal. FIG. 3 illustrates an example of a correlation of a received signal. In this example, it is assumed that the correlation emphasis signal is obtained by calculating the arithmetic mean of three received signals.

As illustrated in FIG. 2, a correlation emphasis signal 0' is an arithmetic mean of a set 101 of received signals 0 to 2. A correlation emphasis signal 1' is an arithmetic mean of a set 102 of received signals 1 to 3. A correlation emphasis signal 2' is an arithmetic mean of a set 103 of received signals 2 to 4. A correlation emphasis signal 3' is an arithmetic mean of a set 104 of received signals 3 to 5. Thus, the received signal 1 is included in the correlation emphasis signals 0' and 1'. The received signal 2 is included in the correlation emphasis signals 0' to 2'. The received signal 3 is included in the correlation emphasis signals 1' to 3'. The received signal 4 is included in the correlation emphasis signals 2' and 3'. As described above, because each correlation emphasis signal is generated using received signals which are used in other correlation emphasis signals which are adjacent in time, the correlation among correlation emphasis signals is higher than the correlation among received signals.

The correlation emphasis unit 51 outputs the generated correlation emphasis signal y'(t) to the autocorrelation matrix generation unit 52.

The autocorrelation matrix generation unit 52 receives an input of the correlation emphasis signal y'(t) from the correlation emphasis unit 51, and acquires a correlation emphasis signal vector Y(t') of the correlation emphasis signal y'(t). In the present embodiment, the correlation emphasis signal vector Y(t') refers to a vector including L correlation signals as elements, and the correlation emphasis signal vector Y(t') is represented by equation (3).

$$Y(t')=[y'(t'L),y'(t'L+1), \ldots ,y'((t'+L)+1)] \qquad (3)$$

In equation (3), L denotes a signal length employed when the correlation matrix is calculated. That is, the correlation emphasis signal vector Y(t') includes, as elements, correlation emphasis signals at times t'L to t'L+L−1.

The autocorrelation matrix generation unit 52 estimates an autocorrelation matrix R of the correlation emphasis signal vector Y(t') represented by equation (3). The autocorrelation matrix R is represented, for example, by equation (4) described below.

$$R=E[Y(t')Y^H(t')] \qquad (4)$$

in equation (4), E[ ] denotes an average taken over an infinite time period, which is also called as an ensemble average. yH(t') denotes an Hermitian transpose of y(t'). Y(t') YH(t') denotes a dyadic product of Y(t') and YH(t'). Because it is practically difficult to determine the average taken over the infinite time period, the autocorrelation matrix generation unit 52 generates the autocorrelation matrix R using the average of N dyadic products Y(t') YH(t') according to equation (5) described below.

$$R = \frac{1}{N} \sum_{t'=K}^{K+N-1} Y'(t')Y'^H(t') \qquad (5)$$

In equation (5), N is an integer selected to be large enough for equation (5) to be a good approximation of equation (4). K is an integer equal to or greater than 0.

The autocorrelation matrix generation unit 52 outputs the generated autocorrelation matrix R to the noise removal unit 55.

Referring again to FIG. 2 and FIG. 3, a discussion is given below using the autocorrelation matrix to compare the correlation among correlation emphasis signals and the correlation among received signals. As illustrated in FIG. 2, the autocorrelation matrix R of the correlation signals 0' to 3' is given by a matrix 105 including a region 151 in which signal components exist. On the other hand, as illustrated in FIG. 3, the autocorrelation matrix R of the received signals 0 to 3 is given by a matrix 106 including a region 161 in which signal components exist. The region 151 is greater in size than the region 161. That is, in the autocorrelation matrix R of the correlation signals 0' to 3', the signal components are located over a greater region than the signal components of the autocorrelation matrix R of the received signals 0 to 3, which means that the correlation among the correlation signals 0' to 3' is higher than the correlation among the received signals 0 to 3.

Referring again to FIG. 1, on the other hand, the noise power estimation unit 53 receives the autocorrelation matrix R from the autocorrelation matrix generation unit 52, and the noise power estimation unit 53 estimates noise power using the autocorrelation matrix R. In the present embodiment, the noise power estimation unit 53 employs a minimum eigenvalue $r_{min}$ of the autocorrelation matrix R as the noise power.

The reason why the minimum eigenvalue $r_{min}$ is employed as the noise power is explained below. Noise does not have autocorrelation, and thus all eigenvalues of the autocorrelation matrix R equally include noise power. In contrast, signals transmitted from another apparatus have a correlation with each other, and thus the minimum eigenvalue $r_{min}$ includes substantially no signal components but the maximum eigenvalue includes many signal components. Therefore, almost all components of the minimum eigenvalue $r_{min}$ are noise components, and thus the minimum eigenvalue $r_{min}$ of the autocorrelation matrix R is employed as the noise power.

The noise power estimation unit 53 outputs information associated with the estimated noise power to the noise power matrix generation unit 54. Although in the present embodiment, the noise power estimation unit 53 estimates the noise power from the autocorrelation matrix R, the noise power may be estimated in another way. For example, a received signal may be acquired from the AD/DA conversion unit 4 and noise power may be estimated from the acquired received signal.

The noise power matrix generation unit 54 receives an input of the information associated with the noise power from the noise power estimation unit 53. Using the received information associated with the noise power, the noise power matrix generation unit 54 determines a noise power matrix for use in removing noise components from the autocorrelation matrix of the correlation emphasis signals. Thus, next, the calculation of the noise power matrix is described below.

Let us consider a case in which there is no signal component, i.e., received signal y(t)=n(t). In this case, the correlation emphasis signal is expressed by equation (6) described below.

$$y'(t) = \frac{1}{M}\sum_{k=0}^{M-1} n(t+k) \quad (6)$$

The autocorrelation matrix R of the correlation emphasis signal y'(t) represented by equation (6) is represented by equation (7) as described below.

$$R = E[Y(t')Y^H(t')] \quad (7)$$

$$= \begin{bmatrix} \beta(0) & \beta(1) & \cdots & \beta(L-1) \\ \beta(1) & \beta(0) & \cdots & \beta(L-2) \\ \vdots & \vdots & \ddots & \vdots \\ \beta(L-1) & \beta(L-2) & \cdots & \beta(0) \end{bmatrix}$$

β(j) is represented by equation (8) as described below.

$$\beta(j) = E[y'(t')y'^*(t'+j)] \quad (8)$$

$$= E\left[\frac{1}{M}\sum_{k=0}^{M-1} n(t'+k) \frac{1}{M}\sum_{k=0}^{M-1} n^*(t'+k+j)\right]$$

In equation (8), j is an integer equal to or greater than 0, and y*(t') denotes a conjugate transpose of y(t'). Because noise has no correlation, equation (8) may be rewritten into equation (9) as described below.

$$\beta(j) = E\left[\frac{1}{M}\sum_{k=0}^{M-1} n(t'+k) \frac{1}{M}\sum_{k=0}^{M-1} n^*(t'+k+j)\right] \quad (9)$$

$$= \frac{1}{M^2} E\left[\sum_{k=0}^{M-1} n(t'+k) \frac{1}{M}\sum_{k=0}^{M-1} n^*(t'+k+j)\right]$$

-continued $$= \begin{cases} \frac{1}{M^2}(M-j)E[n(t'+k)n^*(t'+k)] & (\text{if } 0 \le j < M) \\ 0 & (\text{otherwise}) \end{cases}$$

$$= \begin{cases} \frac{1}{M^2}(M-j)\sigma^2 & (\text{if } 0 \le j < M) \\ 0 & (\text{otherwise}) \end{cases}$$

In equation (9), σ represents noise estimated by the noise power estimation unit 53. In the present embodiment, $\sigma=r_{min}$. When M−j=i, β(j) is given by equation (10) described below.

$$\beta(j) = \beta(M-i) = \begin{cases} \frac{1}{M^2}i\sigma^2 & (\text{if } 0 \le i < M) \\ 0 & (\text{otherwise}) \end{cases} \quad (10)$$

Thus, equation (7) is rewritten as equation (11) described below.

$$R = \frac{1}{M^2}\begin{bmatrix} \alpha(M) & \alpha(M-1) & & 0 \\ \alpha(M-1) & \alpha(M) & & \vdots \\ \vdots & \alpha(M-1) & & 0 \\ \alpha(1) & \vdots & \cdots & \alpha(1) \\ 0 & \alpha(1) & & \vdots \\ \vdots & \vdots & & \alpha(M-1) \\ 0 & 0 & & \alpha(M) \end{bmatrix} \quad (11)$$

In equation (11), α(m) may be represented by equation (12) as described below.

$$\alpha(m) = \sum_{k=1}^{m} \sigma^2 \quad (12)$$

In equation (12), m is an integer equal to or greater than 1.

Thus, when there is no signal component, the received signal may be substantially equal to a noise signal. Therefore, when there is no signal component, the autocorrelation matrix R of the received signal may be regarded as equal to a noise power matrix Π. Thus, the noise power matrix generation unit 54 generates a matrix represented by equation (13) described below to obtain the noise power matrix Π.

$$\Pi = \frac{1}{M^2}\begin{bmatrix} \alpha(M) & \alpha(M-1) & & 0 \\ \alpha(M-1) & \alpha(M) & & \vdots \\ \vdots & \alpha(M-1) & & 0 \\ \alpha(1) & \vdots & \cdots & \alpha(1) \\ 0 & \alpha(1) & & \vdots \\ \vdots & \vdots & & \alpha(M-1) \\ 0 & 0 & & \alpha(M) \end{bmatrix} \quad (13)$$

The noise power matrix generation unit 54 outputs the generated noise power matrix Π to the noise removal unit 55.

The noise removal unit 55 receives an input of the autocorrelation matrix R of the correlation emphasis signals from the autocorrelation matrix generation unit 52. Furthermore, the noise removal unit 55 also receives an input of the noise power matrix Π from the noise power matrix generation unit 54. The noise removal unit 55 removes an influence of the noise from the autocorrelation matrix R by subtracting the noise power matrix Π from the autocorrelation matrix R. After the influence of the noise is removed by the noise removal unit 55, a resultant autocorrelation matrix is given by R' represented by equation (14) described below.

$$R' = R - \beta \Pi \quad (14)$$

In equation (14), β is a coefficient determined depending on an estimation error of the noise. That is, when the value of β is optimized, the influence of the noise is properly removed from the autocorrelation matrix R, and thus then error of the estimated noise power with respect to actual noise power is suppressed.

The noise removal unit 55 outputs the autocorrelation matrix R' obtained after the removal of the influence of the noise to the eigenvalue calculation unit 56.

The eigenvalue calculation unit 56 receives an input of the autocorrelation matrix R' represented by equation (14) from the noise removal unit 55, and the eigenvalue calculation unit 56 calculates eigenvalues of the autocorrelation matrix R'. Note that in this calculation, a plurality of eigenvalues of the autocorrelation matrix R' are determined. The eigenvalue calculation unit 56 outputs the plurality of eigenvalues obtained as the calculation to the signal judgment unit 57.

The signal judgment unit 57 receives an input of the plurality of eigenvalues of the autocorrelation matrix R' from the eigenvalue calculation unit 56. The signal judgment unit 57 extracts a minimum eigenvalue $r_{min}$ and a maximum eigenvalue $r_{max}$ of the autocorrelation matrix R' from the received eigenvalues. The signal judgment unit 57 then calculates the ratio of the maximum eigenvalue $r_{max}$ to the minimum eigenvalue $r_{min}$ of the autocorrelation matrix R' as represented in equation (15) described below.

$$X = \frac{r_{max}}{r_{min}} \quad (15)$$

The signal judgment unit 57 compares the ratio of the maximum eigenvalue $r_{max}$ to the minimum eigenvalue $r_{mm}$ of the autocorrelation matrix R' with a threshold value TH stored in advance. In a case where the ratio X is equal to or greater than the threshold value TH, the signal judgment unit 57 determines that the received signals include a signal transmitted from another apparatus. On the other hand, in a case where the ratio X is smaller than the threshold value TH, the signal judgment unit 57 determines that the received signals include no signal transmitted from another apparatus. The signal judgment unit 57 outputs a determination result to the frequency control unit 6. In the case where it is determined that the received signals include no signal transmitted from another apparatus, the signal judgment unit 57 notifies the baseband processing unit 7 that a frequency band of the received signal is allowed to be used for communication.

The frequency control unit 6 has data which is stored in advance and which indicates oscillation signal frequencies corresponding to respective different frequency bands. When the frequency control unit 6 receives an instruction, from the input/output control unit 8, to start communication in which the current apparatus is an initiator of the communication, the frequency control unit 6 selects one of stored oscillation signal frequencies. The frequency control unit 6 outputs information associated with the selected oscillation signal frequency to the oscillator 3.

Thereafter, the frequency control unit 6 receives an input of the determination result from the signal judgment unit 57 as to whether a signal transmitted from another apparatus is included in the received signal in a frequency band corresponding to the selected frequency of the oscillation signal.

In a case where the received signal in the frequency band corresponding to the selected frequency of the oscillation signal includes a signal transmitted from another apparatus, the frequency control unit 6 selects a frequency, corresponding to the frequency band which has not been subjected to the signal detection process, from the stored oscillation signal frequencies. The frequency control unit 6 outputs information associated with the selected frequency of the oscillation signal to the oscillator 3. The frequency control unit 6 repeatedly changes the oscillation signal frequency to another frequency until a received signal including no signal transmitted from another apparatus is detected, and notifies the oscillator 3 of the newly selected frequency.

In a case where the received signal in the frequency band corresponding to the selected frequency of the oscillation signal includes no signal transmitted from another communication apparatus, the frequency control unit 6 notifies the AD/DA conversion unit 4 of the change in operation mode to communication mode.

The baseband processing unit 7 receives an input of information associated with the usable frequency band from the signal judgment unit 57. The baseband processing unit 7 generates a predetermined frequency notification signal specifying a frequency band to be used in communication with an apparatus with which to communicate. The baseband processing unit 7 sends the generated frequency notification signal to the apparatus, with which to communicate, via the AD/DA conversion unit 4, the mixer 2, and the amplifier 1. Thereafter, the baseband processing unit 7 receives a predetermined signal indicating that the communication is to be performed using the frequency band from the apparatus with which to communicate via the amplifier 1, the mixer 2, and the AD/DA conversion unit 4. Furthermore, the baseband processing unit 7 receives an input of the received signal converted into the baseband signal from the AD/DA conversion unit 4. The baseband processing unit 7 performs processing such as decoding on the received signal. Thereafter, the baseband processing unit 7 outputs the processed signal to the input/output control unit 8. When the baseband processing unit 7 receives an input of data provided by an operator via the input/output control unit 8, the baseband processing unit 7 performs processing such as encoding or the like on the received data. The baseband processing unit 7 outputs the processed data to the AD/DA conversion unit 4. In this way, the communication terminal apparatus according to the present embodiment communicates with the communication partner apparatus using the frequency band determined to be usable.

The input/output control unit 8 performs control such that the data received from the baseband processing unit 7 is displayed on a monitor or the like thereby providing the data to the operator. In response to inputting of data by an operator via a keypad or the like, the input/output control unit 8 outputs the received data to the baseband processing unit 7. The input/output control unit 8 may control inputting and outputting of a voice using a microphone, a speaker, or the like.

When the input/output control unit 8 receives a communication start command from a keypad or the like, the input/output control unit 8 notifies the AD/DA conversion unit 4 of the start of the usable frequency band detection mode and sends an instruction to the frequency control unit 6 to start the communication.

Figure 4:
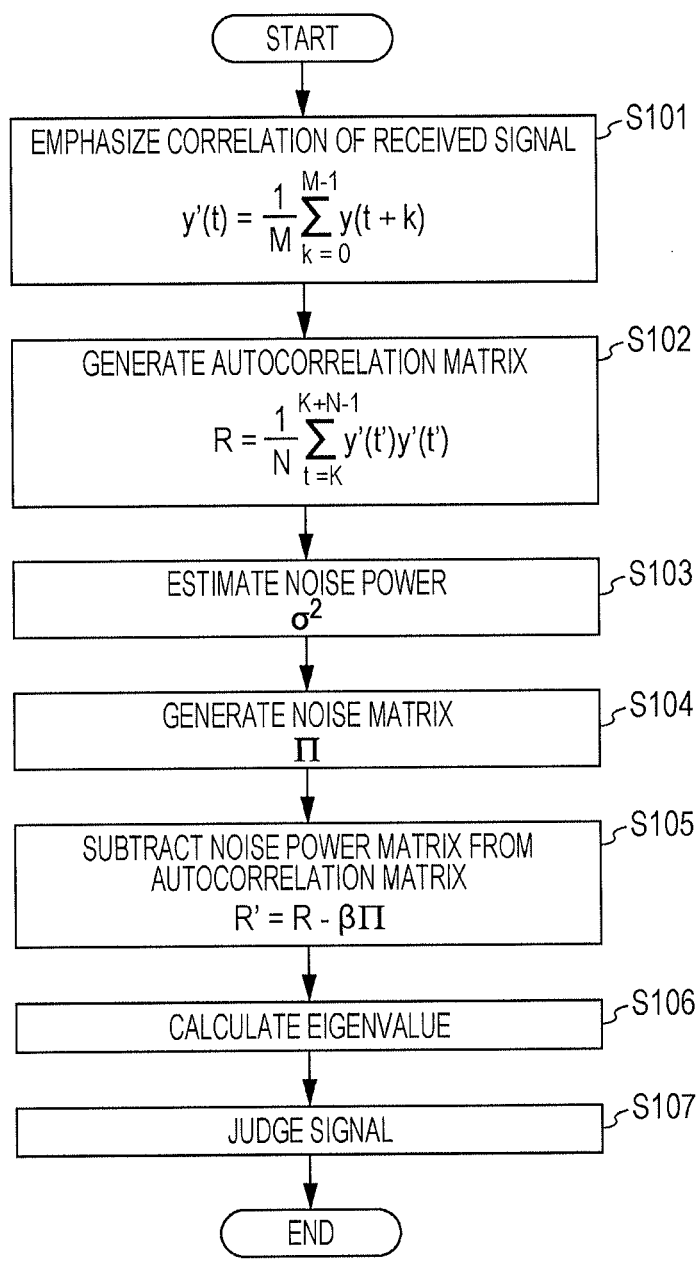
FIG. 4 is a flow chart of a signal detection process performed by a signal detector according to an embodiment.

Next, referring to FIG. 4, a flow of the signal detection process performed by the signal detector according to the present embodiment is described below. FIG. 4 is a flow chart of the signal detection process performed by the signal detector according to the present embodiment.

The correlation emphasis unit 51 receives an input of the digital signal of the received signal from the AD/DA conversion unit 4. The correlation emphasis unit 51 calculates the correlation emphasis signal y'(t') represented by equation (2) by calculating the arithmetic mean of M received signals (step S101).

The autocorrelation matrix generation unit 52 receives an input of the correlation emphasis signal y'(t') from the correlation emphasis unit 51. The autocorrelation matrix generation unit 52 generates an autocorrelation matrix R represented by equation (5) using a mean of N dyadic products Y(t')YH(t') (step S102).

The noise power estimation unit 53 acquires information associated with the autocorrelation matrix R from the autocorrelation matrix generation unit 52, and the noise power estimation unit 53 determines the minimum eigenvalue $r_{min}$ of the autocorrelation matrix R and estimates the noise power $\sigma^2$ by regarding the minimum eigenvalue $r_{min}$ as indicating the noise power $\sigma^2$ (step S103).

The noise power matrix generation unit 54 acquires information associated with the noise power from the noise power estimation unit 53, and the noise power matrix generation unit 54 generates a matrix represented by equation (13) to obtain a noise power matrix Π (step S104).

The noise removal unit 55 receives an input of the autocorrelation matrix R from the autocorrelation matrix generation unit 52. The noise removal unit 55 also receives an input of the noise power matrix Π from the noise power matrix generation unit 54. The noise removal unit 55 subtracts the noise power matrix Π from the autocorrelation matrix R to remove the influence of noise from the autocorrelation matrix R thereby obtaining the autocorrelation matrix R' as represented by equation (14) (step S105).

The eigenvalue calculation unit 56 receives an input of the autocorrelation matrix R' obtained by removing the influence of noise from the noise removal unit 55, and the eigenvalue calculation unit 56 calculates eigenvalues of the autocorrelation matrix R' (step S106).

The signal judgment unit 57 receives an input of the autocorrelation matrix R' obtained as a result of the removal of the influence of noise from the eigenvalue calculation unit 56, and the signal judgment unit 57 determines the ratio X of the maximum eigenvalue $r_{max}$ to the minimum eigenvalue $r_{min}$ of the autocorrelation matrix R' represented by equation (15). If the determined ratio X is equal to or greater than a threshold value, then the signal judgment unit 57 determines that there is a signal. However, if the ratio X is smaller than the threshold value, the signal judgment unit 57 determines that there is no signal (step S107).

Figure 5:
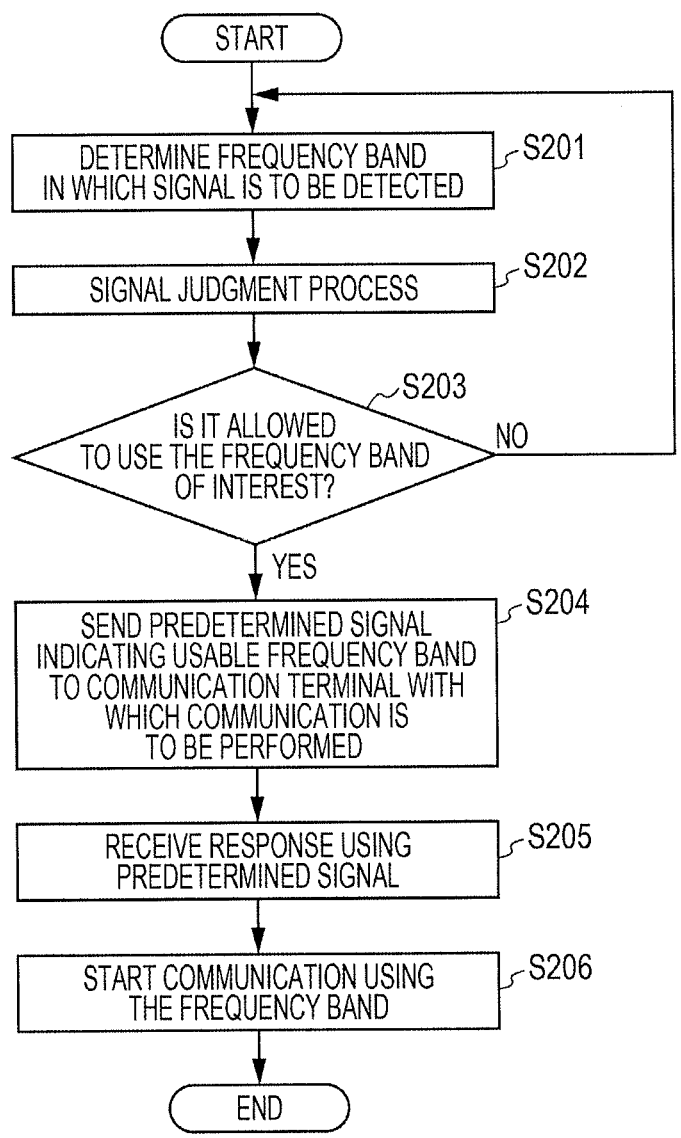
FIG. 5 is a flow chart illustrating a process performed by a communication terminal apparatus until a communication starts.

Next, referring to FIG. 5, an explanation is given below as to a flow of a process performed by a communication terminal apparatus until a communication is started according to the present embodiment. FIG. 5 is a flow chart illustrating a process performed by a communication terminal apparatus until a communication is started.

The frequency control unit 6 receives a communication start command from an operator via the input/output control unit 8. The frequency control unit 6 selects one of frequency bands to be checked in terms of whether a signal is detected therein (step S201). The AD/DA conversion unit 4 also receives the communication start command issued by the operator via the input/output control unit 8, and the operation mode switches into the usable frequency band detection mode.

The signal detector 5 receives, from the AD/DA conversion unit 4, a received signal in the frequency band determined by the frequency control unit 6, and the signal detector 5 performs a signal detection process on the received signal (step S202). The signal detection process in this step S202 corresponds to a sequence of processes illustrated in FIG. 4. The signal detector 5 determines whether the frequency band of interest is allowed to be used for communication based on whether a signal transmitted from another apparatus exists in this frequency band (step S203).

In a case where a signal transmitted from another apparatus exits in the frequency band of interest and thus this frequency band is not allowed to be used for communication (i.e., the answer to step 203 is No), the frequency control unit 6 returns to step S201 to select another frequency band to be checked in terms of whether a signal is detected therein.

On the other hand, in a case where no signal transmitted from another apparatus is found in the frequency band of interest (i.e., the answer to step S203 is Yes), the baseband processing unit 7 and the frequency control unit 6 send a predetermined signal indicating an usable frequency band to a communication terminal apparatus with which to perform communication (step S204).

The baseband processing unit 7 and the frequency control unit 6 receives a response using a predetermined signal from the communication terminal apparatus with which to perform communication (step S205).

The baseband processing unit 7 and the frequency control unit 6 start communication using the frequency band determined to include no signal and thus to be usable for communication (step S206).

Figure 6:
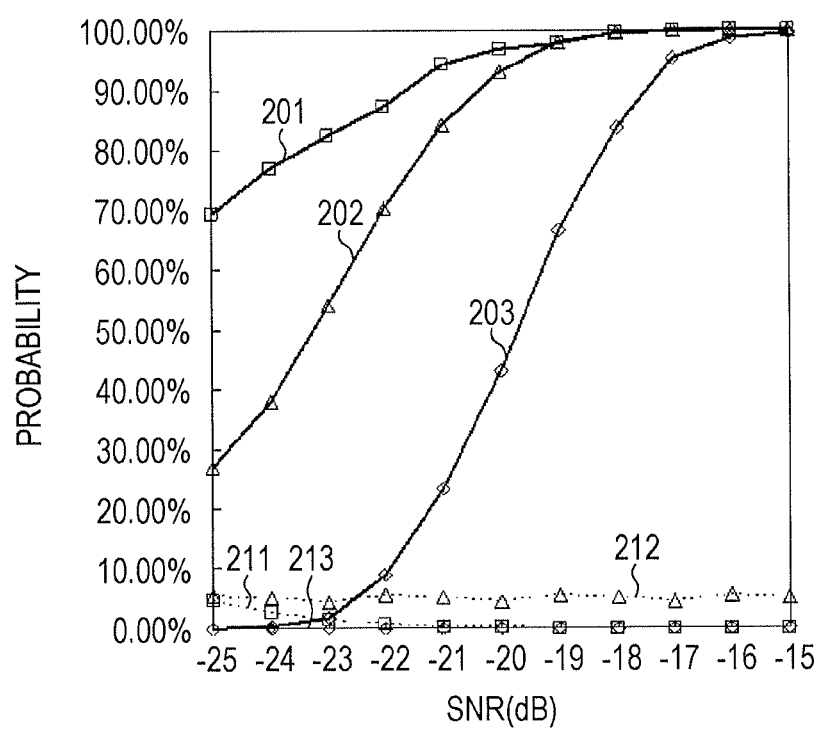
FIG. 6 is a graph illustrating signal detection probabilities as a function of SNR.

Next, referring to FIG. 6, a comparison is given between a signal detection by the signal detector according to the present embodiment and a signal detection by a conventional signal detector. FIG. 6 is a graph illustrating signal detection probabilities as a function of SNR. In FIG. 6, a vertical axis represents a signal detection probability or a detection error probability, and a horizontal axis represents SNR. Note that in the conventional signal detection, a determination as to whether there is a signal is performed based on a ratio of a maximum eigenvalue to a minimum eigenvalue of an autocorrelation matrix of a received signal without emphasizing a correlation and without removing an influence of noise.

A line 201 represents a detection probability of a signal by the signal detector according to the present embodiment. A line 202 represents a signal detection probability for the conventional signal detector for a case where a detection error of 5% is allowed. A line 203 represents a signal detection probability for the conventional signal detector for a case where a detection error of 0% is allowed. A line 211 represents a detection error probability for the signal detector according to the present embodiment. A line 212 represents a detection error probability for the conventional signal detector for a case where a detection error of 5% is assumed. A line 212 represents a detection error probability for the conventional signal detector for a case where a detection error of 0% is assumed.

The lines 212 and 213 represent the detection error probabilities for cases where the detection errors of 5% and 0% are assumed, and thus the detection error probabilities are at values of nearly 5% or 0%. In contrast, in the signal detector according to the present embodiment, as represented by the line 211, the detection error probability is close to 5% when SNR is −25 dB but the detection error probability decreases with increasing SNR and the detection error probability becomes substantially equal to 0% when SNR is equal to or greater than −22 dB. That is, in the signal detector according to the present embodiment, substantially no detection error occurs even when SNR is at rather low levels, and the detection error is as low as 5% even when SNR is as low as −25 dB.

Furthermore, as may be seen from comparison between the lines 201 and 202, the signal detector according to the present embodiment provides a detection probability as high as about two times that provided by the conventional technique for similar assumed detection errors, even when SNR is −25 to −22 dB. As may also be seen from the lines 201 and 202, in the signal detector according to the present embodiment, the detection error probability is substantially equal to 0% when SNR is equal to or greater than −22 dB, that is, the signal detector according to the present embodiment provides a high signal detection probability which is similar to or higher than the signal detection probability provided by the conventional signal detector for the case where the detection error of 5% is allowed. On the other hand, as represented by the line 203, in the conventional signal detector, a detection probability equal to or higher than 90% with a detection error probability of 0% is achieved only for SNR higher than −17 dB. In contrast, in the signal detector according to the present embodiment, the detection error probability is substantially equal to 0% for SNR equal to or greater than −22 dB, and the signal detection probability is equal to or greater than 90% for SNR nearly equal to −20 dB.

As described above, in the signal detector according to the present embodiment and in the communication terminal apparatus including the signal detector according to the present embodiment, a determination as to whether there is a signal is performed based on eigenvalues of a matrix obtained by removing an influence of noise from an autocorrelation matrix of signals obtained by emphasizing a correlation of received signals. This method provides an increase in difference between the minimum eigenvalue and the maximum eigenvalue of the autocorrelation matrix, which results in an improvement in signal detection reliability. In particular, even when SNR is low, it is possible to accurately determine whether there is a signal or not.

(Hardware Configuration)

Figure 7:
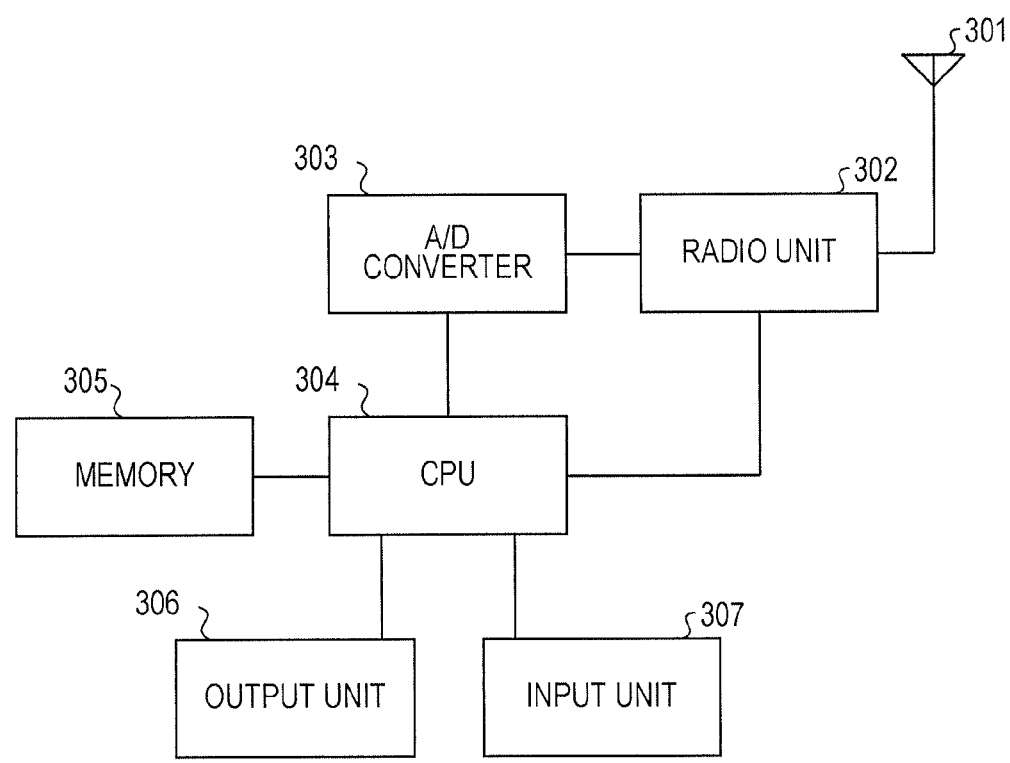
FIG. 7 is a diagram illustrating a hardware configuration of a communication terminal apparatus according to an embodiment.

Next, referring to FIG. 7, a description is given below as to a hardware configuration of a communication terminal apparatus according to an embodiment. FIG. 7 is a diagram illustrating the hardware configuration of the communication terminal apparatus according to the embodiment.

As illustrated in FIG. 7, the communication terminal apparatus according to the present embodiment includes an antenna 301, a radio unit 302, an A/D converter 303, a CPU (Central Processing Unit) 304, a memory 305, an output unit 306, and an input unit 307.

The radio unit 302, the analog-to-digital converter 303, the memory 305, the output unit 306, and the input unit 307 are connected to the CPU 304 via a bus.

The radio unit 302 is connected to the antenna 301. The radio unit 302 includes, for example, an amplifier 1 a mixer 2, an oscillator 3, etc.

The A/D converter 303 functions, for example, as the AD/DA conversion unit 4.

The output unit 306 is, for example, a monitor, a speaker, or the like. The input unit 307 is, for example, a keypad, a microphone, or the like. The output unit 306, the input unit 307, and the CPU 304 function as a whole, for example, as the input/output control unit 8 illustrated in FIG. 1.

The CPU 304 and the memory 305 provide, for example, the functions of the signal detector 5 and the baseband processing unit 7 illustrated in FIG. 1. For example, the memory 305 stores various kinds of programs for realizing processes performed by various parts of the signal detector 5 and the baseband processing unit 7 illustrated in FIG. 1. The CPU 304 reads these programs from the memory 305 and executes them to generate processes that realize the functions described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal detection method, comprising:
generating, based on received signals given at fixed intervals and the signals partially overlapping in the fixed intervals, correlation emphasis signals corresponding to the respective intervals;
estimating noise power included in the correlation emphasis signals of the received signals;
generating, based on a first autocorrelation matrix of the correlation emphasis signals and the estimated noise power, a noise power matrix representing noise components included in the first autocorrelation matrix;
removing, based on the first autocorrelation matrix and the noise power matrix, an influence of noise from the first autocorrelation matrix, resulting in a second autocorrelation matrix;
calculating a plurality of eigenvalues of the second autocorrelation matrix; and
determining, based on the calculated plurality of eigenvalues, whether a signal transmitted from an external apparatus is included in the received signals.

2. The signal detection method according to claim 1, wherein determining whether a signal transmitted from an external apparatus is included in the received signals comprises:
determining a minimum eigenvalue and a maximum eigenvalue of the plurality of eigenvalues;
comparing a ratio of the maximum eigenvalue to the minimum eigenvalue with a threshold; and
when the ratio is equal to or greater than the threshold, determining that the received signals include a signal transmitted by the external apparatus; or
when the ratio is less than the threshold, determining that the received signals do not include the signal transmitted by the external apparatus.

3. The signal detection method according to claim 1, wherein the correlation emphasis signals of the received signals each include an arithmetic mean of a predetermined number of the received signals.

4. The signal detection method according to claim 1, wherein estimating noise power included in correlation emphasis signals of received signals comprises determining a minimum eigenvalue of the first autocorrelation matrix of the correlation emphasis signals of the received signals, as the estimated noise power.

5. The signal detection method according to claim 1, wherein determining a second autocorrelation matrix comprises subtracting the noise power matrix from the first autocorrelation matrix so as to remove noise components in the first autocorrelation matrix, thereby obtaining the second autocorrelation matrix.

6. A wireless communication apparatus, comprising:
a memory; and
a processor coupled to the memory and configured to:
based on received signals given at fixed intervals and the signals partially overlapping in the fixed intervals, generate correlation emphasis signals corresponding to the respective fixed intervals;
generate a first autocorrelation matrix based on the correlation emphasis signals generated by the processor;
estimate noise power included in the correlation emphasis signals;
generate, based on the first autocorrelation matrix and the estimated noise power, a noise power matrix comprising noise components included in the first autocorrelation matrix;
remove, based on the first autocorrelation matrix and the noise power matrix, an influence of noise from the first autocorrelation matrix, resulting in a second autocorrelation matrix, the second autocorrelation matrix being the first autocorrelation matrix from which the influence of noise has been removed by the processor;
calculate a plurality of eigenvalues of the second autocorrelation matrix;
determine, based on the plurality of eigenvalues calculated by the processor, whether a signal transmitted from an external apparatus is included in the received signals; and
perform communication using a frequency band of the received signals determined by the processor as including no signal transmitted by the external apparatus.

7. A signal detector comprising:
a memory; and
a processor coupled to the memory and configured to:
based on received signals that are given at fixed intervals and are overlapped with each other, generate correlation emphasis signals corresponding to the respective fixed intervals;
generate a first autocorrelation matrix based on the correlation emphasis signals generated by the processor;
estimate noise power in the correlation emphasis signals;
generate, based on the first autocorrelation matrix and the estimated noise power, a noise power matrix included in the first autocorrelation matrix, the noise power matrix having noise power components;
remove, based on the first autocorrelation matrix and the noise power matrix, an influence of noise from the first autocorrelation matrix, resulting in a second autocorrelation matrix;
calculate a plurality of eigenvalues of the second autocorrelation matrix, the second autocorrelation matrix being the first autocorrelation matrix from which the influence of noise has been removed by the processor; and
determine, based on the plurality of eigenvalues calculated by the processor, whether a signal transmitted from an external apparatus is included in the received signals.

8. The signal detector according to claim 7, wherein the processor is configured to generate the correlation emphasis signals by sampling the received signals for respective intervals and calculating a mean of a predetermined number of sampled received signals at successive times.

9. The signal detector according to claim 7, wherein the processor is configured to remove the influence of noise from the first autocorrelation matrix by subtracting a matrix obtained by multiplying the noise power matrix by a predetermined coefficient from the first autocorrelation matrix.

10. The signal detector according to claim 8, wherein the processor is configured to remove the influence of noise from the first autocorrelation matrix by subtracting a matrix obtained by multiplying the noise power matrix by a predetermined coefficient from the first autocorrelation matrix.

* * * * *